«12» United States Patent
Muto et al.

(10) Patent No.: US 7,703,436 B2
(45) Date of Patent: Apr. 27, 2010

(54) CONTROL DEVICE OF INTERNAL COMBUSTION ENGINE

(75) Inventors: Harufumi Muto, Nishikamo-gun (JP); Yuichiro Ido, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 402 days.

(21) Appl. No.: 11/246,313

(22) Filed: Oct. 11, 2005

(65) Prior Publication Data

US 2007/0240680 A1  Oct. 18, 2007

(30) Foreign Application Priority Data

Oct. 14, 2004 (JP) ............... 2004-300472

(51) Int. Cl.
  *F02D 41/04* (2006.01)
  *F02D 41/18* (2006.01)
(52) U.S. Cl. .................................................. 123/361
(58) Field of Classification Search ................. 123/361, 123/396, 399, 352; 73/118.1, 114.32–114.37
  See application file for complete search history.

(56) References Cited

U.S. PATENT DOCUMENTS

| 5,018,383 | A | | 5/1991 | Togai et al. | |
| 5,073,865 | A | * | 12/1991 | Togai et al. | 701/103 |
| 5,080,064 | A | * | 1/1992 | Buslepp et al. | 123/399 |
| 5,282,449 | A | | 2/1994 | Takahashi et al. | 123/350 |
| 5,391,127 | A | * | 2/1995 | Nishimura | 477/110 |
| 5,629,852 | A | * | 5/1997 | Yokoyama et al. | 701/101 |
| 5,992,382 | A | * | 11/1999 | Bruedigam et al. | 123/396 |
| 6,792,914 | B2 | * | 9/2004 | Fuwa | 123/399 |

FOREIGN PATENT DOCUMENTS

| JP | A 05-65845 | | 3/1993 |
| JP | 05248250 A | * | 9/1993 |
| JP | A-05-321736 | | 12/1993 |
| JP | A-02-267342 | | 11/1999 |
| JP | A-2000-303885 | | 10/2000 |
| JP | A 2001-41095 | | 2/2001 |

* cited by examiner

*Primary Examiner*—Stephen K Cronin
*Assistant Examiner*—Arnold Castro
(74) *Attorney, Agent, or Firm*—Oliff & Berridge, PLC

(57) ABSTRACT

A control device of an internal combustion engine determining a target throttle opening degree based on a target intake air amount which can simply and reliably detect any control abnormality is provided. The control device of an internal combustion engine determining a target throttle opening degree based on a target intake air amount compares the target intake air amount and an intake air amount measured by an air flow meter to detect a control abnormality. By this control device, it is possible to simply and reliably detect a control abnormality in the process of determination of the target throttle opening degree or control of the throttle valve.

3 Claims, 9 Drawing Sheets

CONTROL DEVICE OF INTERNAL COMBUSTION ENGINE

BACKGROUND OF THE INVENTION

1. Field of the Invention

The present invention relates to a control device of an internal combustion engine.

2. Description of the Related Art

Known in the art is a control device of an internal combustion engine setting an intake air amount (that is, target intake air amount) in accordance with an amount of depression of an accelerator expressing a demand of the driver of the vehicle, etc., finding a target opening degree of the throttle valve based on the target intake air amount (that is, target throttle opening degree), and controlling the throttle valve to this target throttle opening valve to control the intake air amount (for example, see Japanese Unexamined Patent Publication No. 5-65845).

In such a control device of an internal combustion engine, it is preferable to judge if a control abnormality occurs in setting the target throttle opening degree based on the target intake air amount and the control of the opening degree of the throttle valve following that. As the method for judging the existence of any such control abnormality, the method may be considered of comparing the requested throttle opening degree able to be determined from the accelerator depression and engine speed and the actual throttle opening degree measured by a throttle opening degree sensor, but in actuality, these two throttle opening degrees sometimes do not match. Therefore, with this method, it is sometimes not possible to accurately judge the existence of a control abnormality.

That is, for example, when an electronic control type transmission is mounted or when a system is mounted for preventing sideways sliding etc. and stabilizing the vehicle by controlling the engine output, since the target intake air amount is determined based on the acceleration depression and engine speed expressing the demand of the driver and also the operating state of the vehicle or engine, the requested throttle opening degree and the target throttle opening degree do not necessarily match and, as a result, even if the control is normal, the requested throttle opening degree and actual throttle opening degree sometimes do not match. Further, in a system controlling the throttle opening degree and the opening characteristics of the intake valve (for example, the lift etc.) so as to control the intake air amount, the throttle opening degree realizing the same target intake air amount will differ depending on the opening characteristics of the intake valve, so sometimes the requested throttle opening degree and the target throttle opening degree will not match and therefore sometimes the requested throttle opening degree and actual throttle opening degree will not match.

SUMMARY OF THE INVENTION

An object of the present invention is to provide a control device of an internal combustion engine which determines a target throttle opening degree based on a target intake air amount and is able to simply and reliably detect a control abnormality.

According to one aspect of the present invention, there is provided a control device of an internal combustion engine determining a target throttle opening degree based on a target intake air amount, which compares the target intake air amount and an intake air amount measured by an air-flow meter to detect a control abnormality.

This control device of the internal combustion engine is designed to compare the target intake air amount and the intake air amount measured by an air flow meter to detect a control abnormality. By doing this, it becomes possible to simply and more reliably detect a control abnormality in the process of determination of the target throttle opening degree or control of the throttle valve.

According to another aspect of the present invention, there is provided a control device of an internal combustion engine determining a target throttle opening degree based on a target intake air amount, which is provided with an intake calculation formula for finding an intake air amount based on an intake pipe internal pressure at a downstream side of a throttle valve and compares the target intake air amount and an intake air amount found from the intake calculation formula using the intake pipe internal pressure measured by an intake pipe internal pressure sensor to detect a control abnormality.

This control device of the internal combustion engine is designed to compare the target intake air amount and the intake air amount found using the intake pipe internal pressure measured by the intake pipe internal pressure sensor so as to detect a control abnormality. By doing this, it is possible to simply and more reliably detect a control abnormality in the process of determination of the target throttle opening degree or control of the throttle valve.

Preferably, at least one of the target intake air amount and the target throttle opening degree is determined based on a demand of a driver and an operating state of at least one of a vehicle and the internal combustion engine. Note that the "operating state of the internal combustion engine" spoken of here also shall include the opening characteristics of an intake valve or exhaust valve at that time.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
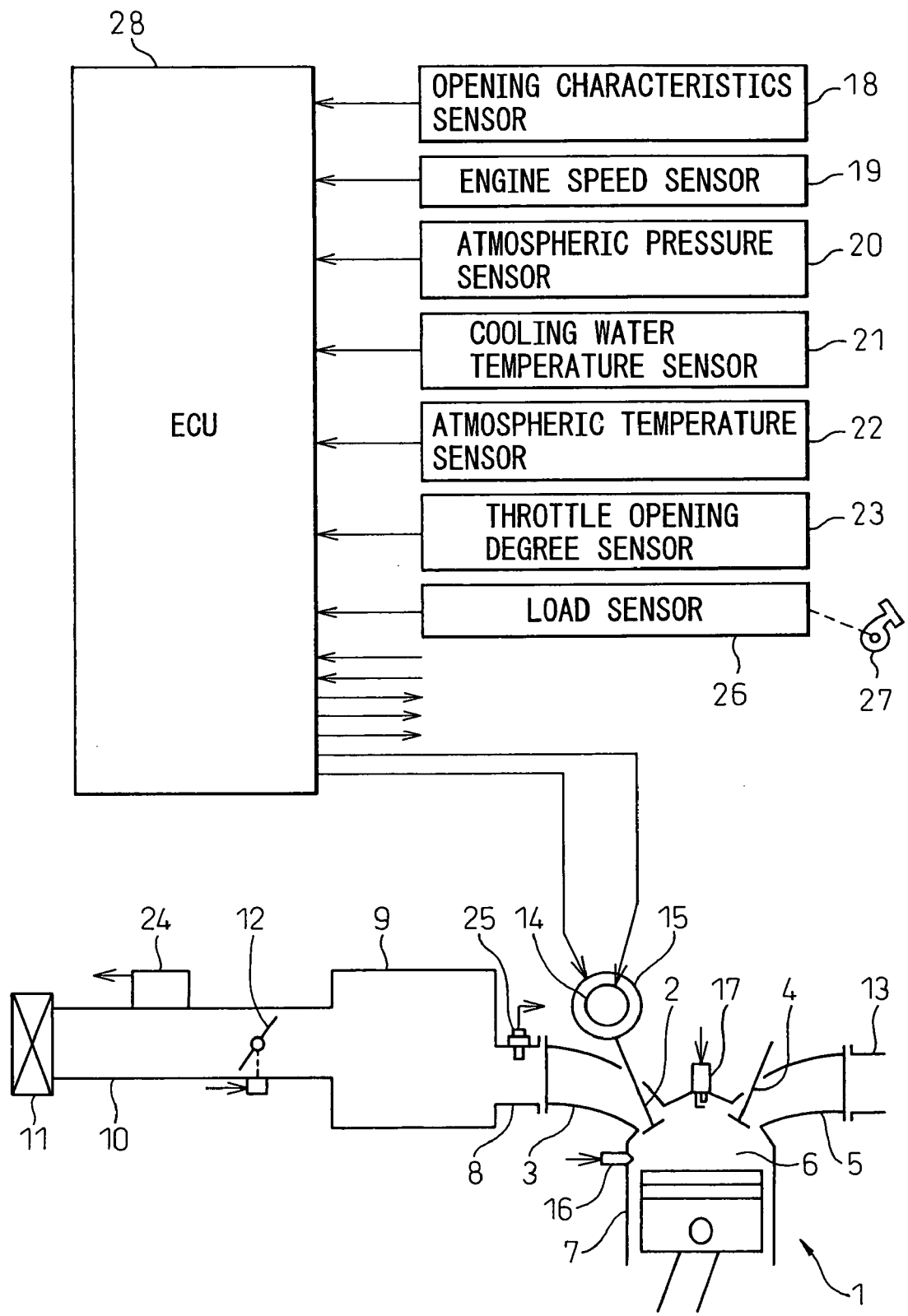
FIG. 1 is a schematic view of an example of the case of application of the present invention to an in-cylinder injection, spark ignition type internal combustion engine.

Next, embodiments of the present invention will be explained in detail with reference to the drawings. Note that in the drawings, the same or similar components are assigned common reference numerals.

FIG. 1 is a schematic view of an example of the case of application of the present invention to an in-cylinder injection, spark ignition type internal combustion engine. Note that the present invention may also be applied to another spark ignition type internal combustion engine or a compression ignition type internal combustion engine.

In FIG. 1, 1 indicates an internal combustion engine body, 2 indicates an intake valve, 3 indicates an intake port, 4 indicates an exhaust valve, 5 indicates an exhaust port, and 6 indicates a combustion chamber formed in a cylinder 7. The intake port 3 of each cylinder is connected to a surge tank 9 through a downstream side intake pipe 8. The surge tank 9 is connected through an upstream side intake pipe 10 to an air cleaner 11. The intake pipe 10 is provided with a throttle valve 12 in it. On the other hand, the exhaust port 5 of each cylinder is connected to an exhaust pipe 13.

Further, 14 indicates a valve lift changer for changing the valve lift. That is, in this embodiment, the valve lift changer 14 may be operated to control the valve lift of the intake valve 2.

If operating the valve lift changer 14 to change the valve lift of the intake valve 2, the opening area of the intake valve 2 is changed along with it. In the intake valve 2 of the present embodiment, the opening area of the intake valve 2 increases along with the increase in the valve lift. Further, as explained later, in this embodiment, if the valve lift changer 14 is used to change the valve lift of the intake valve 2, the operating angle of the intake valve 2 is changed along with this.

On the other hand, 15 indicates an operating timing shifter for shifting the operating timing without changing the valve lift and operating angle of the intake valve 2. That is, by operating the operating timing shifter 15, it is possible to make the operating timing of the intake valve 2 shift to the advanced side or shift to the delayed side and thereby possible to adjust the valve overlap etc.

Reference numeral 16 indicates a fuel injector, 17 indicates a spark plug, 18 indicates an opening characteristics sensor for detecting the valve lift, the operating angle and the operating timing shift of the intake valve 2, and 19 indicates an engine speed sensor for detecting the engine speed. Reference numeral 20 is an atmospheric pressure sensor for measuring the pressure of the atmosphere around the internal combustion engine, 21 is a cooling water temperature sensor for measuring the temperature of the internal combustion engine cooling water, and 22 is an atmospheric temperature sensor for measuring the temperature of the atmosphere around the internal combustion engine. Reference numeral 23 indicates a throttle opening degree sensor for measuring the opening degree of the throttle valve 12, 24 indicates an air flow meter, and 25 indicates an intake pipe internal pressure sensor for measuring the pressure in the intake pipe at the downstream side of the throttle valve 12. Reference numeral 26 indicates a load sensor connected to an accelerator pedal 27 and generating an output proportional to the amount of depression of the accelerator pedal 27 (that is, the accelerator depression). Reference numeral 28 is an electronic control unit (ECU) which receives as input the output of the sensors as shown in FIG. 1.

In the present embodiment, each fuel injector 16 is connected to the ECU 28. Signals from the ECU 28 can be used to control the amount of fuel injected and the injection timing. Similarly, each spark plug 17 is connected to the ECU 28. Signals from the ECU 28 can be used to control the ignition timing. Further, the opening degree of the throttle valve 12 can be changed regardless of the amount of accelerator depression. The throttle opening degree can be changed to control the pressure in the intake pipe at the downstream side of the throttle valve.

Figure 2:
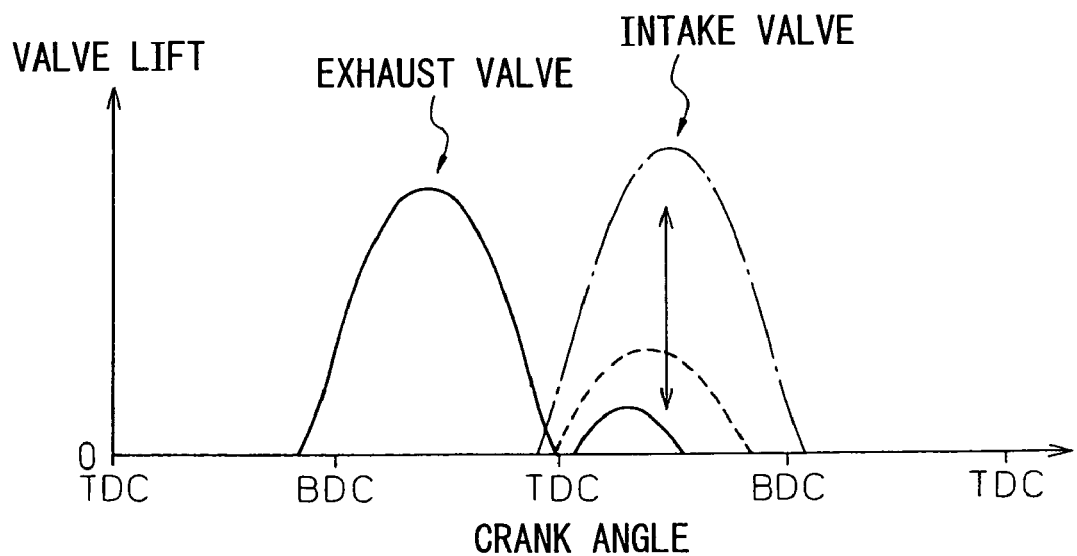
FIG. 2 is a view of the state of change of a valve lift and operating angle of an intake valve along with operation of a valve lift changer.

FIG. 2 is a view of the state of change of the valve lift of the intake valve 2 along with operation of the valve lift changer 14. As shown in FIG. 2, the valve lift changer 14 enables the intake valve 2 to be continuously changed in valve lift. Further, as explained above, in the present embodiment, along with a change of the valve lift, the operating angle corresponding to the opening time of the intake valve 2 also changes. Specifically, along with an increase in the valve lift of the intake valve 2, the operating angle of the intake valve 2 is increased (solid line→broken line→dot-chain line).

Further, in the present embodiment, along with the operation of the valve lift changer 14, the timing at which the valve lift of the intake valve 2 peaks is also changed. More specifically, as shown in FIG. 2, along with the increase of the valve lift of the intake valve 2, the timing at which the valve lift of the intake valve 2 peaks is delayed.

Figure 3:
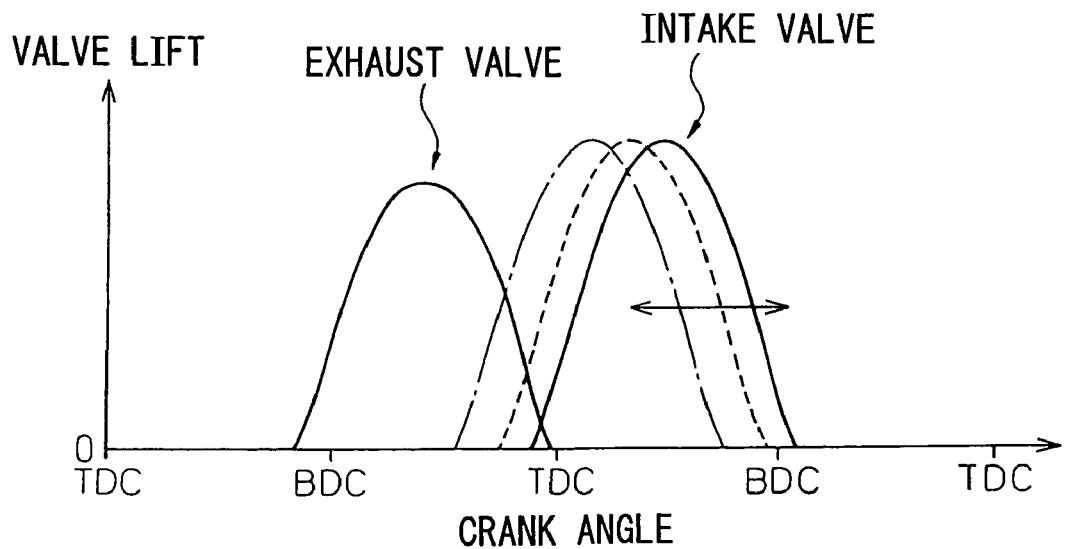
FIG. 3 is a view of the state of shift of operating timing of an intake valve along with operation of an operating timing shifter.

FIG. 3 is a view of the state of shift of the operating timing of the intake valve 2 along with operation of the operating timing shifter 15. As shown in FIG. 3, the operating timing shifter 15 enables the intake valve 2 to be continuously changed in operating timing. At this time, the operating angle of the intake valve 2 is not changed.

In this embodiment, the amount of air taken into the combustion chamber 6 of each cylinder can be controlled by cooperative control of the opening characteristics of the intake valve 2 (lift, operating angle, valve timing) and opening degree of the throttle valve 12 (more specifically, the intake pipe internal pressure at the downstream side of the throttle valve). That is, the intake air amount of the internal combustion engine can be controlled by cooperatively controlling the opening characteristics of the intake valve 2 and the opening degree of the throttle valve 12. Further, in another embodiment, in addition to this, the opening degree of an idle speed control valve (not shown) may be controlled to control the intake air amount.

In recent years however, models of the intake systems of internal combustion engines have been created based on fluid dynamics etc. and control of internal combustion engines based on control parameters calculated using these models has been studied. That is, for example, a throttle model, intake pipe model, intake valve model, etc. are constructed for the intake system of an internal combustion engine to find model equations for the air passing through the intake system and these model equations are used to calculate the parameters necessary for various types of control. These are used for control of the internal combustion engine.

In this embodiment as well, in the configuration shown in FIG. 1, a model of the intake system is created based on the throttle model, intake pipe model, and intake valve model.

Model equations such as those explained below are provided. Below, these models and model equations will be explained.

Figure 4:
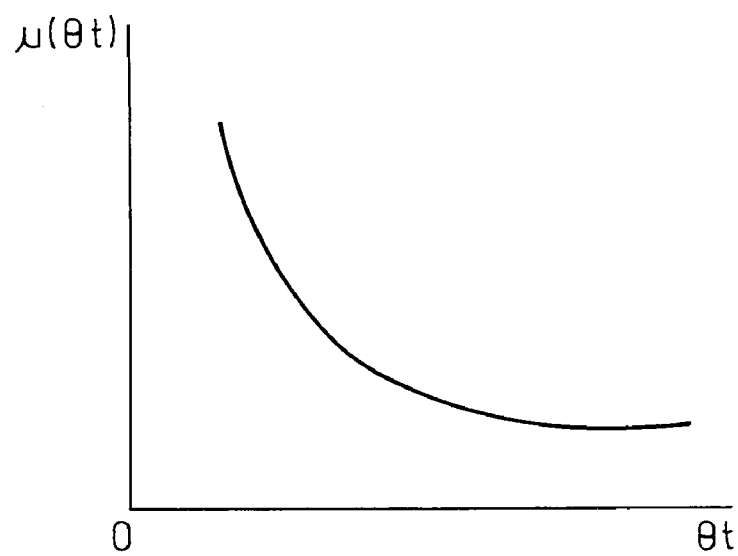
FIG. 4 is a view of the relationship between a throttle opening degree and flow rate coefficient.

First, the throttle model will be explained. The throttle model is obtained by creating a model of a throttle valve. According to this, the throttle valve passage air flow rate mt (g/s) is expressed by the following equation (1). Here, Pac (kPa) is the intake pipe internal pressure at the upstream side of the throttle valve 12 (hereinafter referred to as the "upstream intake pipe internal pressure") and is a value found considering at least the pressure loss of the air cleaner 11. Further, Ta (K) is the atmospheric temperature, Pm (kPa) is the intake pipe internal pressure at the downstream side of the throttle valve 12 (hereinafter referred to as the "downstream side intake pipe internal pressure"), and R is the gas constant. Further, μ is the flow coefficient at the throttle valve 12. This is a function of the throttle opening degree θt and is determined from the map shown in FIG. 4. Further, At (m²) is the cross-sectional area of the opening of the throttle valve (hereinafter referred to as the "throttle opening area") and is a function of the throttle opening θt. Note that if μ·At combining the flow coefficient μ and the throttle opening area At is made a function F(θt) having just the throttle opening degree θt as a variable, equation (1) can be rewritten as shown in equation (2). Further, if finding the value of the function F(θt) by experiments, simulation, etc. and preparing a map using θt as an argument in advance, the value of F(θt) can be found from the throttle valve θt based on this map:

$$mt = \mu \cdot At \cdot \frac{Pac}{\sqrt{R \cdot Ta}} \cdot \Phi\left(\frac{Pm}{Pac}\right) \tag{1}$$

$$mt = F(\theta t) \cdot \frac{Pac}{\sqrt{R \cdot Ta}} \cdot \Phi\left(\frac{Pm}{Pac}\right) \tag{2}$$

Figure 5:
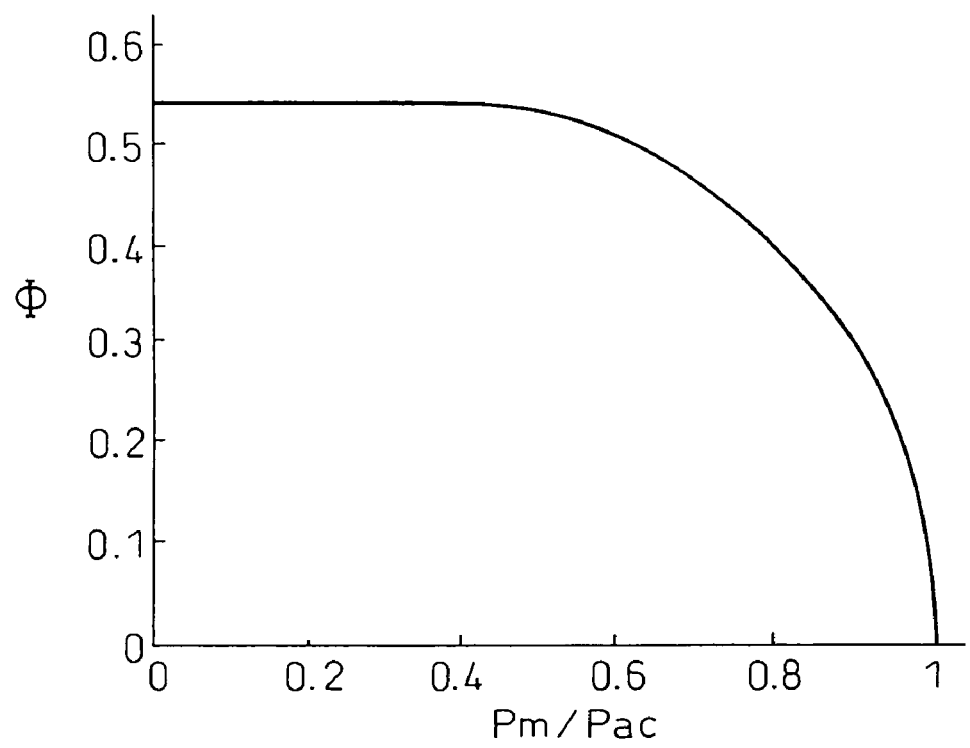
FIG. 5 is a view of a function Φ (Pm/Pac)

Φ (Pm/Pac) is a function shown by the following equation (3). κ in equation (3) is the specific heat ratio (κ=Cp (constant pressure specific heat)/Cv (constant volume specific heat), a constant value). This Φ (Pm/Pac) can be expressed as a graph such as shown in FIG. 5. So this graph is stored in the ECU 28 as a map, and in practice, it is also possible to find the value of Φ (Pm/Pac) from the map rather than using equation (3) for calculation.

$$\Phi\left(\frac{Pm}{Pac}\right) = \begin{cases} \sqrt{\frac{\kappa}{2(\kappa+1)}} & \frac{Pm}{Pac} \leq \frac{1}{\kappa+1} \\ \sqrt{\left\{\left(\frac{\kappa-1}{2\kappa}\right) \cdot \left(1 - \frac{Pm}{Pac}\right) + \frac{Pm}{Pac}\right\} \cdot \left(1 - \frac{Pm}{Pac}\right)} & \frac{Pm}{Pac} > \frac{1}{\kappa+1} \end{cases} \tag{3}$$

Figure 6:
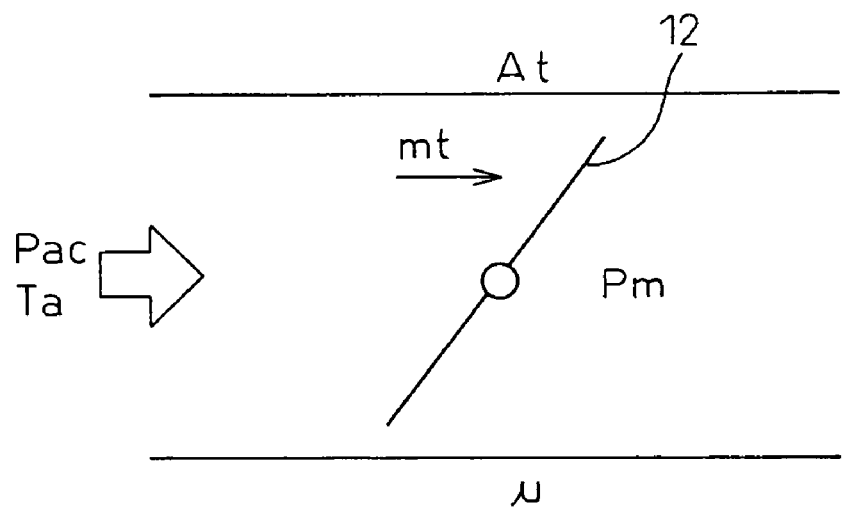
FIG. 6 is a view of the basic concept of a throttle model.

The model equations of the throttle model, that is, equation (1) to equation (3), are obtained by applying the Law of the Conservation of Mass, Law of the Conservation of Energy, and Law of the Conservation of Motion to the model of the throttle valve 12 shown in FIG. 6 assuming the pressure of the gas upstream of the throttle valve 12 to be upstream side intake pipe internal pressure Pac, the temperature of the gas upstream of the throttle valve 12 to be the atmospheric temperature Ta, and the pressure of the gas passing through the throttle valve 12 to be the downstream side intake pipe internal pressure Pm and further utilizing the state equation of a gas, formula defining the specific heat ratio, and Mayer's relation.

Note that here the pressure of the gas upstream of the throttle valve 12 used is not the atmospheric pressure Pa, but the upstream side intake pipe internal pressure Pac because the actual pressure at the upstream side of the throttle valve 12 normally becomes a pressure lower than the atmospheric pressure Pa during engine operation since there is pressure loss at the upstream side of the throttle valve in the engine intake system. Further, in particular in the configuration shown in FIG. 1, the air cleaner 11 is provided at the upstream-most part of the engine intake system, so to more accurately calculate the throttle valve passage air flow rate mt, it may be considered more preferable to use the upstream side intake pipe internal pressure Pac found considering at least the pressure loss of the air cleaner 11.

In this regard, the upstream side intake pipe internal pressure Pac may be measured by providing a pressure sensor directly upstream of the throttle valve 12, but may also be calculated without using a pressure sensor. That is, the difference between the atmospheric pressure Pa and the upstream side intake pipe internal pressure Pac can be expressed as shown in the following equation (4) by Bernoulli's equation.

$$Pa - Pac = \frac{1}{2}\rho v^2 = k\frac{Ga^2}{\rho} \tag{4}$$

Here, ρ is the atmospheric density, v is the flow velocity of air passing through the air cleaner 11, Ga is the flow rate of air passing through the air cleaner 11, and k is a proportional coefficient of v and Ga. If using the standard atmospheric density ρ0 and the pressure correction coefficient ekpa and temperature correction coefficient ektha for converting the standard atmospheric density ρ0 to the atmospheric density ρ, equation (4) can be rewritten to the following equation (5). Further, equation (5) can be rewritten to the following equation (6) using the function f(Ga) having only the flow rate Ga as a variable. Further, if finding the values of this function f(Ga) by experiments, simulation, etc. and creating in advance a map having Ga as an argument, it is possible to find the value of f(Ga) from the flow rate Ga based on that map.

$$Pa - Pac = \frac{k}{\rho 0} \cdot Ga^2 \cdot \frac{1}{ekpa \cdot ektha} \tag{5}$$

$$Pa - Pac = \frac{f(Ga)}{ekpa \cdot ektha} \tag{6}$$

Equation (6) can be modified to the following equation (7) showing the upstream side intake pipe internal pressure Pac. In equation (7), the flow rate Ga can be detected by the air flow meter 24 at the downstream side of the air cleaner 11. Further, that flow rate Ga can be used to find the value of f(Ga) from the above-mentioned map of f(Ga). Further, the pressure correction coefficient ekpa can be set by the detected atmospheric pressure Pa, while the temperature correction coefficient ektha can be set by the detected atmospheric temperature Ta.

$$Pac = Pa - \frac{f(Ga)}{ekpa \cdot ektha} \tag{7}$$

Further, in equation (7), the flow rate Ga of air passing through the air cleaner 11 can be considered the throttle valve passage air flow rate mt, so equation (7) can be modified to the following equation (8).

$$Pac = Pa - \frac{f(mt)}{ekpa \cdot ektha} \quad (8)$$

Further, the flow rate Ga is proportional to the engine speed NE and the later explained cylinder air filling rate K1, so if making j a proportional coefficient, equation (7) can be modified as in the following equation (9).

$$Pac = Pa - \frac{f(j \cdot NE \cdot K1)}{ekpa \cdot ektha} \quad (9)$$

Next, the intake pipe model will be explained. The intake pipe model is a model of the part of the intake pipe 8 etc. from the throttle valve 12 to the intake valve 2 (below, called the "intake pipe part 8'"). According to this, model equations like the following equation (10) and equation (11) are obtained for the downstream side intake pipe internal pressure Pm (kPa) and downstream side intake pipe internal temperature Tm (K). Here, mc (g/s) is the cylinder intake air flow rate, while Vm (m$^3$) is a constant equal to the volume of the intake pipe part 8'.

$$\frac{d}{dt}\left(\frac{Pm}{Tm}\right) = \frac{R}{Vm} \cdot (mt - mc) \quad (10)$$

$$\frac{dPm}{dt} = \kappa \cdot \frac{R}{Vm} \cdot (mt \cdot Ta - mc \cdot Tm) \quad (11)$$

Figure 7:
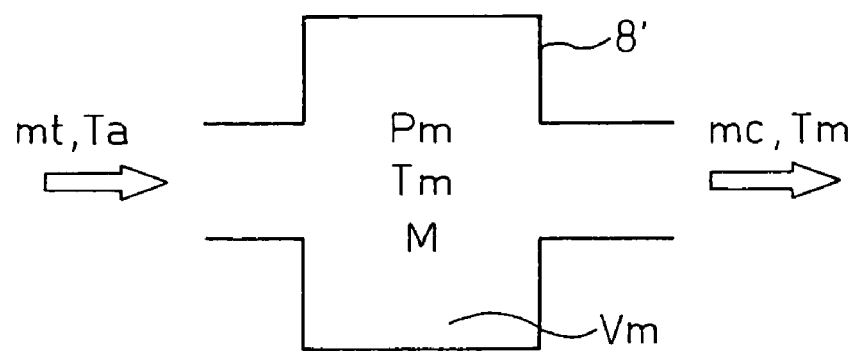
FIG. 7 is a view of the basic concept of an intake pipe model.

Here, the intake pipe model will be explained with reference to FIG. 7. If the total amount of gas of the intake pipe part 8' is M, since the change in the total amount of gas along with time is equal to the difference between the flow rate of gas flowing into the intake pipe part 8', that is, the throttle valve passage air flow rate mt, and the flow rate of gas flowing out from the intake pipe part 8', that is, the cylinder intake air flow rate mc, due to the Law of the Conservation of Mass, the following equation (12) is obtained. From this equation (12) and the gas state equation (Pm·Vm=M·R·Tm), equation (10) is obtained.

$$\frac{dM}{dt} = mt - mc \quad (12)$$

Further, the amount of change of the energy M·Cv·Tm of the gas of the intake pipe part 8' along with time is equal to the difference between the energy of the gas flowing into the intake pipe part 8' and the energy of the gas flowing out from the intake pipe part 8'. For this reason, if the temperature of the gas flowing into the intake pipe part 8' is the atmospheric temperature Ta and the temperature of the gas flowing out from the intake pipe part 8' is the downstream side intake pipe internal temperature Tm, due to the Law of the Conservation of Energy, the following equation (13) is obtained. From this equation (13) and the gas state equation, equation (11) is obtained.

$$\frac{d(M \cdot Cv \cdot Tm)}{dt} = Cp \cdot mt \cdot Ta - Cp \cdot mc \cdot Tm \quad (13)$$

Finally, the intake valve model will be explained. The intake valve model is a model of an intake valve. According to this, the cylinder intake air flow rate mc is expressed by a model equation such as the following equation (14). A and B in equation (14) are compliance parameters determined based on at least engine speed NE and can be found by preparing a map in advance and searching through the map in accordance with need. Note that in the present embodiment, as explained above, each intake valve 2 is provided with a valve lift changer 14 and operating timing shifter 15 to enable the opening characteristics such as the valve lift and operating timing of the intake valve 2 to be changed, so the compliance parameters A and B are determined based on the setting of the opening characteristics of the intake valve 2.

$$mc = A \cdot Pm - B \quad (14)$$

Figure 8:
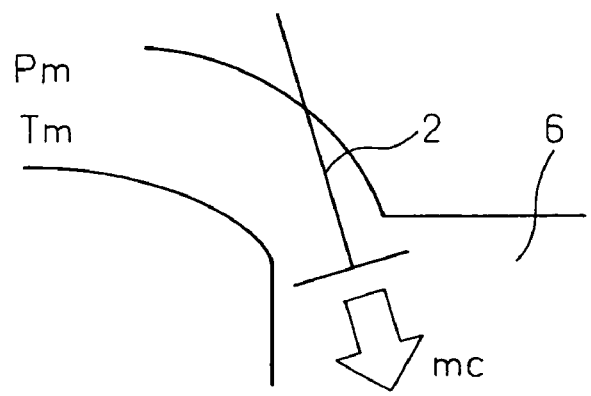
FIG. 8 is a view of the basic concept of an intake valve model.

The above-mentioned intake valve model will be explained referring to FIG. 8. In general, the amount of air filled in a combustion chamber 6 when the intake valve 2 is closed, that is, the cylinder air filling amount Mc, is determined when the intake valve 2 is closed (at the time of intake valve closing) and is proportional to the pressure in the combustion chamber 6 at the time of intake valve closing. Further, the pressure inside the combustion chamber 6 at the time of intake valve closing can be deemed equal to that pressure of the gas upstream of the intake valve, that is, the downstream side intake pipe internal pressure Pm. Therefore, the cylinder air filling amount Mc can be approximated as being proportional to the downstream side intake pipe internal pressure Pm.

Here, if making the average amount of all of the air flowing out from the intake pipe part 8' per unit time or the amount of air taken into all of the combustion chambers 6 from the intake pipe part 8' per unit time averaged over the intake stroke of one cylinder the cylinder intake air flow rate mc (explained in detail below), since the cylinder air filling amount Mc is proportional to the downstream side intake pipe internal pressure Pm, the cylinder intake air flow rate mc can also be considered proportional to the downstream side intake pipe internal pressure Pm. From this, based on theory and the rule of thumb, the equation (14) is obtained. Note that the compliance parameter A in equation (14) is a proportional coefficient, while the compliance parameter B is a value relating to the amount of burned gas remaining in the combustion chamber 6 at the time of closing of an exhaust valve.

Note that it is learned that by making each of the compliance parameters A and B two different values for the case where the downstream side intake pipe internal pressure Pm is large and the case where it is small even for the same engine speed etc. (for example, A1, B1 and A2, B2), that is, by expressing the cylinder intake air flow rate mc by two equations like equation (14) (that is, linear equation of the downstream side intake pipe internal pressure Pm), the cylinder intake air flow rate mc can be found more accurately in some cases. This is believed to be related to the fact that when in particular there is a period where an intake valve 2 and a exhaust valve 4 are both open (that is, valve overlap), the burned gas flows back to the intake port 3. That is, in the case where there is valve overlap, when the downstream side intake pipe internal pressure Pm is a predetermined pressure or more, the higher the downstream side intake pipe internal pressure Pm, the more remarkably the back flow of the burned gas is reduced, so compared with when it is less than the predetermined pressure, the value of A is made larger and the value of B is made smaller.

Figure 9:
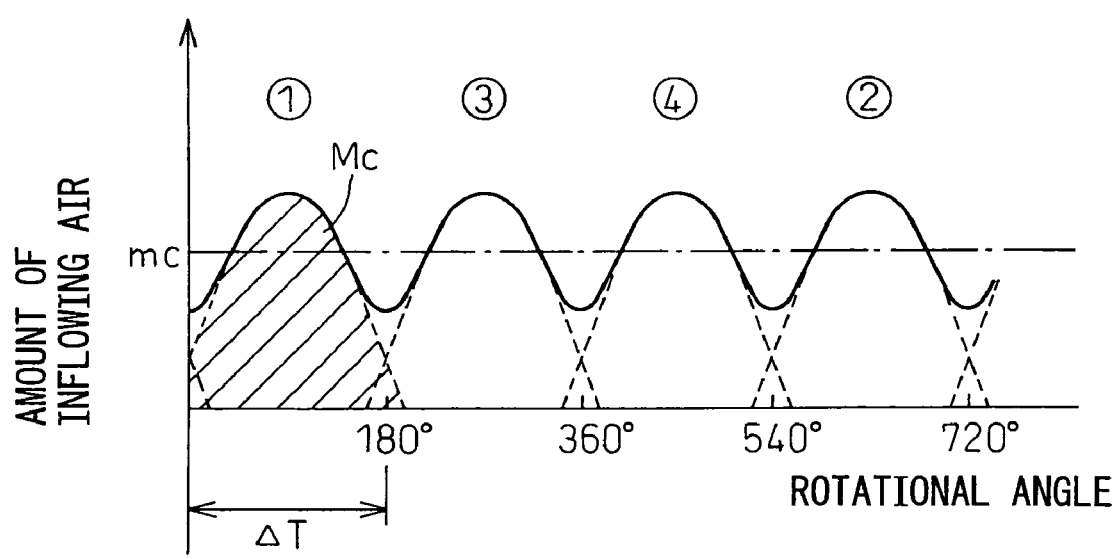
FIG. 9 is a view relating to the definitions of the cylinder air filling amount and cylinder intake air flow rate.

Here, the cylinder intake air flow rate mc will be explained with reference to FIG. 9 for the case where the internal combustion engine has four cylinders. Note that, in FIG. 9, the abscissa indicates the rotational angle of the crank shaft and the ordinate indicates the amount of air actually flowing from the intake pipe part 8' to the combustion chambers 6 per unit time. As shown in FIG. 9, in a four-cylinder internal combustion engine, the intake valves 2 for example open in the order of the #1 cylinder, #3 cylinder, #4 cylinder, and #2 cylinder. Air flows into the combustion chambers 6 of the cylinders from the intake pipe part 8' in accordance with the amounts of opening of the intake valves 2 corresponding to those cylinders. The changes in the flow rates of the air flowing from the intake pipe part 8' to the combustion chambers 6 of the cylinders are as shown by the broken line in FIG. 9. The combination of these, that is, the flow rate of the air from the intake pipe part 8' to the combustion chambers 6 of all of the cylinders, is as shown by the solid line in FIG. 9. Further, the cylinder air filling amount Mc to for example the #1 cylinder corresponds to the part shown by hatching in FIG. 9.

As opposed to this, the average of the flow rate of the air flowing from the intake pipe part 8' to the combustion chambers 6 of all of the cylinders shown by the solid line is the cylinder intake air flow rate mc and is shown by the one-dot chain line in the figure. Further, the cylinder intake air flow rate mc shown by the one-dot chain line multiplied with the time $\Delta T_{180°}$ required for the crank shaft to rotate 180° in the case of four cylinders (that is, in a four-stroke type internal combustion engine, the angle 720° of rotation of the crank shaft in one cycle divided by the number of cylinders) becomes the cylinder air filling amount Mc. Therefore, by multiplying the cylinder intake air flow rate mc calculated by the intake valve model with $\Delta T_{180°}$, the cylinder air filling amount Mc can be calculated (Mc=mc·$\Delta T_{180°}$). Further, by dividing this cylinder air filling amount Mc by the mass of the air occupying a volume corresponding to the amount of exhaust per cylinder in a state of 1 atm and 25° C., the cylinder air filling rate Kl can be calculated. In this way, the cylinder air filling amount Mc, cylinder intake air flow rate mc, and cylinder air filling rate Kl are proportional to each other in relationship. If finding any one of these, the values of the others can be found. That is, these values can be converted to each other.

Note that, in this specification, the intake air amount of the internal combustion engine is the amount of air taken into the combustion chambers of all of the cylinders of the internal combustion engine (during operation). This can also be expressed using any of the cylinder air filling amount Mc, cylinder intake air flow rate mc, and cylinder air filling rate Kl.

However, in the present embodiment, as explained above, the valve lift changer 14 or operating timing shifter 15 enables opening characteristics of an intake valve 2 (lift, operating angle, valve timing) to be controlled, while the throttle valve 12 enables the downstream side intake pipe internal pressure to be controlled. Further, by cooperatively controlling the opening characteristics and opening degree of the throttle valve 12 (more specifically, the intake pipe internal pressure on the downstream side of the throttle valve), the intake air amount is controlled. That is, the throttle valve and the opening characteristic control means constituted by the valve lift changer 14 and operating timing shifter 15 cooperate to control the intake air amount. Further, in the present embodiment, at the time of such intake air amount control, the above-mentioned model equations are utilized for control. Below, the specific method will be explained with reference to the flow chart of FIG. 10.

Figure 10:
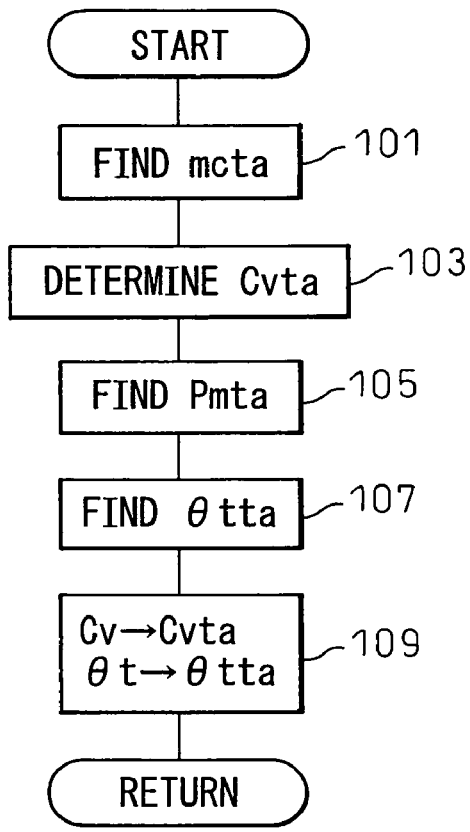
FIG. 10 is a flow rate of a control routine for intake air amount control performed in an embodiment of the present invention.

FIG. 10 is a flow chart of the control routine for intake air amount control in the present embodiment. This control routine is executed by the ECU 28 by interruption every predetermined time, that is, every control period Ts.

When this control routine starts, first, at the step 101, the target intake air amount mcta to be realized after the elapse of a time corresponding to the control period Ts is found. Note that, as explained above, the intake air amount can be expressed using any of the cylinder air filling amount Mc, cylinder intake air flow rate mc, and cylinder air filling rate Kl, but in the following explanation, this is expressed using the cylinder intake air flow rate mc. Therefore, the target intake air amount mcta is more specifically the cylinder intake air flow rate mc to be realized after the elapse of a time corresponding to the control period Ts.

This target intake air amount mcta may be found by preparing in advance a map linking the accelerator depression L and engine speed NE expressing the demand of the driver with the required torque TQr and a map linking the required torque TQr with the target intake air amount mcta and finding the value based on these maps, but in the present embodiment, this is found as follows.

That is, in the present embodiment, a map for finding the throttle opening degree in the case where the opening characteristics are set to predetermined reference states from the accelerator depression L and engine speed NE, that is, the throttle opening degree (required throttle opening degree) θtb demanded by the driver of the vehicle by depressing the accelerator in the case where the opening characteristics are set to predetermined reference states, is prepared in advance and stored in the ECU 28. Here, the reference states, for example, can be made the standard valve lift or operating angle and operating timing in an ordinary engine not having a valve lift changer 14 or operating timing shifter 15.

Further, first, a required throttle opening degree θtb is found based on the map for finding the required throttle opening degree θtb from the accelerator depression L and the engine speed NE. Further, this required throttle opening degree θtb is used to determine the model equation (equation (2)) of the above-mentioned throttle model (following equation (15)).

$$mtb = F(\theta tb) \cdot \frac{Pac}{\sqrt{R \cdot Ta}} \cdot \Phi\left(\frac{Pm}{Pac}\right) \quad (15)$$

On the other hand, if the opening characteristics are set to predetermined reference states, the compliance parameters A and B of the model equation (equation (14)) of the above-mentioned intake valve model are determined from the engine speed NE etc. and that model equation is determined. If the compliance parameters A and B are set to Ab and Bb, the following equation (16) is obtained.

$$mcb = Ab \cdot Pm - Bb \quad (16)$$

Further, the state where the intake air amount becomes the target intake air amount is the convergence state. At that time, the throttle valve passage air flow rate mt and cylinder intake air flow rate mc become equal. Therefore, if finding the cylinder intake air flow rate mcb at the time when the throttle valve passage air flow rate mtb obtained from the model equation (equation (15)) of the throttle model determined in this way and the cylinder intake air flow rate mcb obtained from the model equation (equation (16)) of the intake valve model obtained in this way become equal for the same downstream side intake pipe internal pressure Pm, this can be called the target intake air amount mcta.

Figure 11:
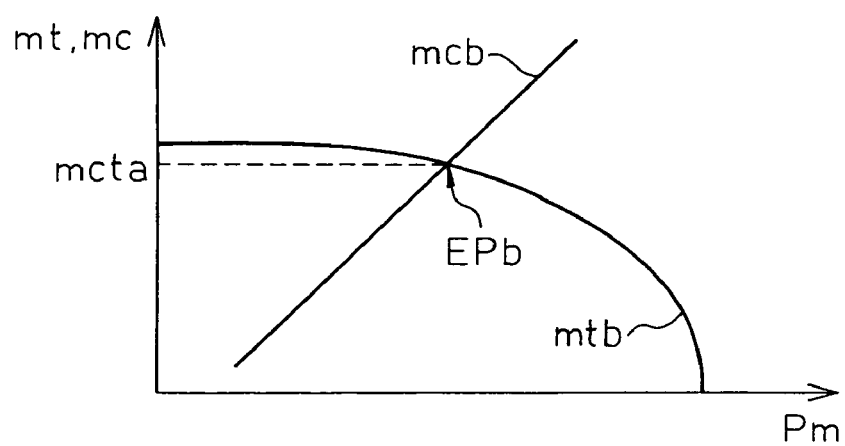
FIG. 11 is a view relating to step 101 of the control routine of FIG. 10 and shows a target intake air amount mcta.

Further, finding the target intake air amount mcta in the above way is synonymous with finding the intersecting point EPb between the curve mtb expressed by the model equation (equation (15)) of the throttle model determined in the above way and the line mcb expressed by the model equation (equation (16)) of the intake valve model determined in this way and finding the coordinate of the ordinate of the point EPb, as illustrated in FIG. 11. Here, when finding the intersecting point EPb, if using the equation expressing the curve mtb (equation (15)) as it is to try to find the intersecting point EPb, the calculation would become extremely complicated. Therefore, to simplify the calculation, it is also possible to approximate the equation expressing the curve mtb (equation (15)) by a plurality of linear equations of the downstream side intake pipe internal pressure Pm. That is, the curve mtb is approximated by a plurality of lines. Specifically, for example, the throttle valve passage air flow rates mtb are calculated at predetermined intervals of the downstream side intake pipe internal pressure Pm based on the equation expressing the curve mtb (equation (15)) to find points on the curve mtb at each predetermined interval of the downstream side intake pipe internal pressure Pm and the lines connecting adjoining points are used as lines approximating the curve mtb. Further, the linear equations expressing these approximation lines become linear approximation equations of the equation expressing the curve mtb (equation (15)).

In this respect, the equation expressing the curve mtb is approximated to linear equations in order to facilitate finding the intersecting point EPb. Therefore what is necessary here is a linear approximation equation near the intersecting point EPb. Therefore, it is also possible to find just this linear approximation equation. In this case, by also finding in advance the cylinder intake air flow rates mcb at predetermined intervals of the downstream side intake pipe internal pressure Pm based on the equation expressing the line mcb (equation (16)) and finding where the magnitudes of the throttle valve passage air flow rate mtb and cylinder intake air flow rate mcb invert, the position of the intersecting point EPb can be identified.

That is, the linear approximation equation near the intersecting point EPb (that is, in the part where the magnitudes of the throttle valve passage air flow rate mtb and cylinder intake air flow rate mcb invert), for example, is made a linear equation expressing a line connecting the two points on the curve mtb around the point on the curve mtb where the magnitudes of the throttle valve passage air flow rate mtb and cylinder intake air flow rate mcb invert.

Note that, as will probably be understood from the above explanation, if making the reference states the standard valve lift or operating angle and operating timing in an ordinary engine not having the valve lift changer 14 and operating timing shifter 15 and using the above method to find the target intake air amount mcta, it is possible to find the intake air amount the same as the intake air amount intended or demanded by the driver by a certain accelerator depression Lc and engine speed NEc in an ordinary engine as the target intake air amount mcta for the same accelerator depression Lc and engine speed NEc in the present embodiment.

If the target intake air amount mcta is found at step 101, at the next step 103, the target opening characteristic Cvta of the intake valve 2, that is, the target lift Ltta and target operating angle Sata, and the target operating timing shift Vtta (that is, the amount of advance or delay from the reference operating timing due to the displacement by the operating timing shifter) are determined. Note that, as clear from the above explanation, in the present embodiment, the lift Lt and the operating angle Sa are in a predetermined relationship. If the operating angle Sa is determined, the lift Lt is also determined, so when determining the target lift Ltta and target operating angle Sata, in practice the target operating angle Sata is determined using the map.

More specifically, at step 103, the target operating angle Sata and target operating timing shift Vtta are determined based on a map prepared so as to obtain an operating angle Sa and operating timing shift Vt whereby the fuel efficiency, emission, torque fluctuation, and other conditions become comprehensively optimal for the engine speed NE, target intake air amount mcta, etc. This map is found in advance by experiments etc. and stored in the ECU 28.

When the target opening characteristic Cvta is determined at step 103, at the next step 105, the target intake pipe internal pressure Pmta is found. This target intake pipe internal pressure Pmta is the intake pipe internal pressure on the downstream side of the throttle valve Pm for realizing the target intake air amount mcta when the opening characteristic Cv of the intake valve 2 is set to the target opening characteristic Cvta.

Further, in the present embodiment, this target intake pipe internal pressure Pmta is found as follows using the model equation of the above-mentioned intake valve model (equation (14)). That is, first, the opening characteristic Cv is assumed to be set to the target opening characteristic Cvta, the compliance parameters A and B of the model equation of the above-mentioned intake valve model (equation (14)) are determined from the engine speed NE etc., and that model equation is determined. That is, if the compliance parameters A and B are determined as Af and Bf, the following equation (17) is obtained.

$$mcf = Af \cdot Pm - Bf \quad (17)$$

Further, the target intake pipe internal pressure Pmta is the downstream side intake pipe internal pressure Pm for realizing the target intake air amount mcta in this equation (17), so can be expressed as in the following equation (18) based on equation (17).

$$Pmta = \frac{mcta + Bf}{Af} \quad (18)$$

Figure 12:
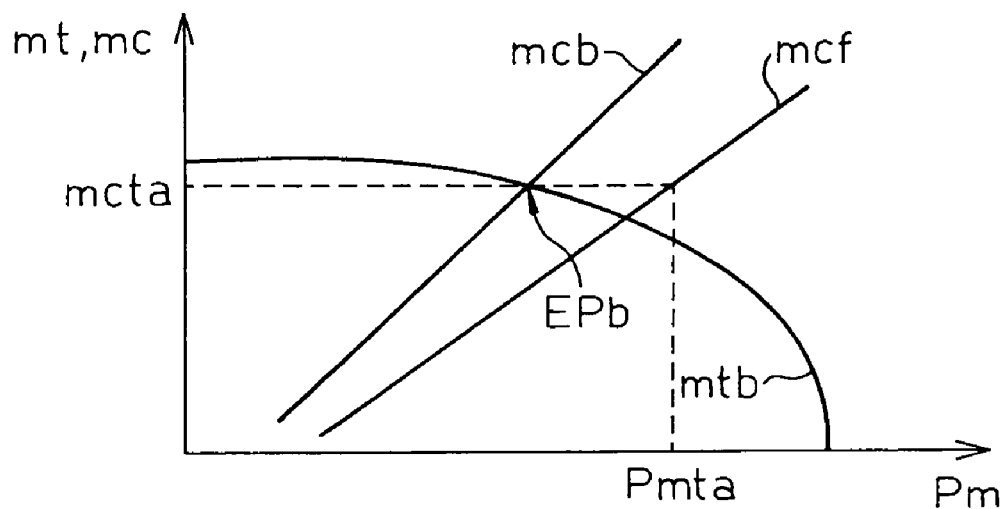
FIG. 12 is a view relating to step 105 of the control routine of FIG. 10 and shows a target intake pipe internal pressure Pmta.

If illustrating the line mcf expressed by the model equation of the intake valve model (equation (17)) in the case where the opening characteristic Cv is set to the target opening characteristic Cvta and the target intake pipe internal pressure Pmta, the result becomes for example as shown in FIG. 12.

When the target intake pipe internal pressure Pmta is found at step 105, at the next step 107, the target throttle opening degree θtta is found. This target throttle opening degree θtta is the throttle opening degree θt for making the downstream side intake pipe internal pressure Pm the target intake pipe internal pressure Pmta. In the present embodiment, this target throttle opening degree θtta can be found as follows using the model equation (equation (2)) of above-mentioned throttle model.

That is, when making the throttle opening degree θt the target throttle opening degree θtta, the downstream side intake pipe internal pressure Pm should converge to the target intake pipe internal pressure Pmta and the throttle valve passage air flow rate mt should converge to the target intake air amount mcta, so the following equation (19) stands.

$$mcta = F(\theta tta) \cdot \frac{Pac}{\sqrt{R \cdot Ta}} \cdot \Phi\left(\frac{Pmta}{Pac}\right) \quad (19)$$

Further, equation (19) can be modified as in the following equation (20).

$$F(\theta tta) = \frac{mcta}{\dfrac{Pac}{\sqrt{R \cdot Ta}} \cdot \Phi\left(\dfrac{Pmta}{Pac}\right)} \quad (20)$$

Further, here, the left side of equation (20) is a function of only the throttle opening degree θt, so by calculating the value of the right side of equation (20), it is possible to find the target throttle opening degree θtta based on equation (20). That is, for example, by conversely using the above-mentioned map finding the value of F(θt) from the throttle opening degree θt, it is possible to use the value calculated from the right side of equation (20) to find the target throttle opening degree θtta.

Note that the equation (20) can be rewritten to the following equation (21) if using the equation (8) and equation (18):

$$F(\theta tta) = \frac{mcta}{\dfrac{\left(Pa - \dfrac{f(mcta)}{ekpa \cdot ektha}\right)}{\sqrt{R \cdot Ta}} \cdot \Phi\left(\dfrac{\dfrac{mcta + Bf}{Af}}{Pa - \dfrac{f(mcta)}{ekpa \cdot ektha}}\right)} \quad (21)$$

Figure 13:
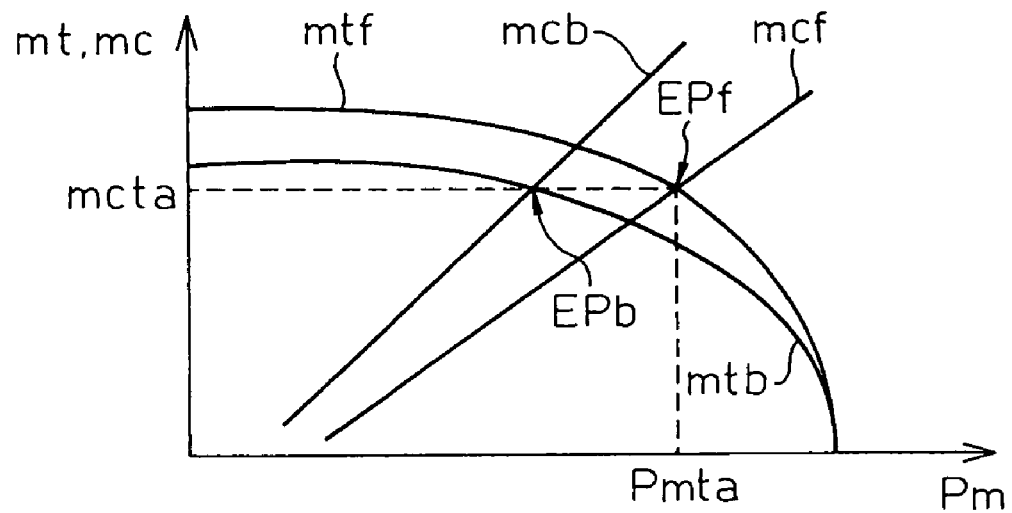
FIG. 13 is a view relating to step 107 of the control routine of FIG. 10.

Further, if entering the target throttle opening degree θtta found in the above way into the equation (2), the following equation (22) is obtained. Further, if illustrating the curve of the throttle passage air flow rate mtf expressed by this equation (22), a curve passing through the point EPf (Pmta, mcta) as shown in FIG. 13 is obtained.

$$mtf = F(\theta tta) \cdot \frac{Pac}{\sqrt{R \cdot Ta}} \cdot \Phi\left(\frac{Pm}{Pac}\right) \quad (22)$$

When the target throttle opening degree θtta is found at step 107, at the next step 109, the valve lift changer 14 and operating timing shifter 15 are controlled so that the opening characteristic Cv of the intake valve 2 becomes the target opening characteristic Cvta and the throttle valve 12 is controlled so that the throttle opening degree θt becomes the target throttle opening degree θtta. Due to this, the intake air amount is controlled to become the target intake air amount mcta. Further, when ending step 109, the routine returns to step 101 from where similar control is repeated.

From the above explanation, in this embodiment, it can be said that the target opening degree θtta is finally determined based on the target intake air amount mcta and the throttle valve 12 is controlled so that throttle opening degree θt becomes the target throttle opening degree θtta and thereby the intake air amount is controlled. Further, in this case, it is preferable to detect any control abnormality in the process of determination of the target throttle opening degree θtta or control of the throttle valve.

As a method for detecting control abnormalities, the method may be considered of comparing the required throttle opening degree able to be determined from the accelerator depression and engine speed expressing the demand of the driver and the actual throttle opening degree measured by a throttle opening degree sensor. In actuality, however, these two throttle opening degrees will sometimes not match even if control is normal. Therefore, with this method, sometimes it is not possible to judge a control abnormality, that is, control abnormalities cannot be accurately detected.

That is, if controlling the throttle opening degree and the opening characteristics of the intake valve to control the intake air amount as in the present embodiment, the throttle opening degree for realizing the same target intake air amount will differ depending on the opening characteristics of the intake valve, so as explained above sometimes the required throttle opening degree θtb and the target throttle opening degree θtta will not match. Even if the control is normal, sometimes the required throttle opening degree θtb and the actual throttle opening degree will not match, so this method cannot accurately detect control abnormalities.

Further, as other cases, for example, the case where an electronic control type transmission is mounted or the case of mounting a system preventing lateral sliding and stabilizing the vehicle by controlling the output of the engine may be considered, That is, in these cases, since the target intake air amount is determined based on not only the accelerator depression and engine speed expressing the demand of the driver and also the operating state of the vehicle or engine, the required throttle opening degree and target throttle opening degree will not necessarily match. As a result, even if the control is normal, sometimes the required throttle opening degree and actual throttle opening degree will not match.

In this embodiment, in consideration of the above point, the method explained below is used to detect any control abnormality. That is, in the present embodiment, control abnormalities are detected by performing the control shown by the control routine of FIG. 14 in parallel with the control of the intake air amount explained earlier with reference to FIG. 10.

Figure 14:
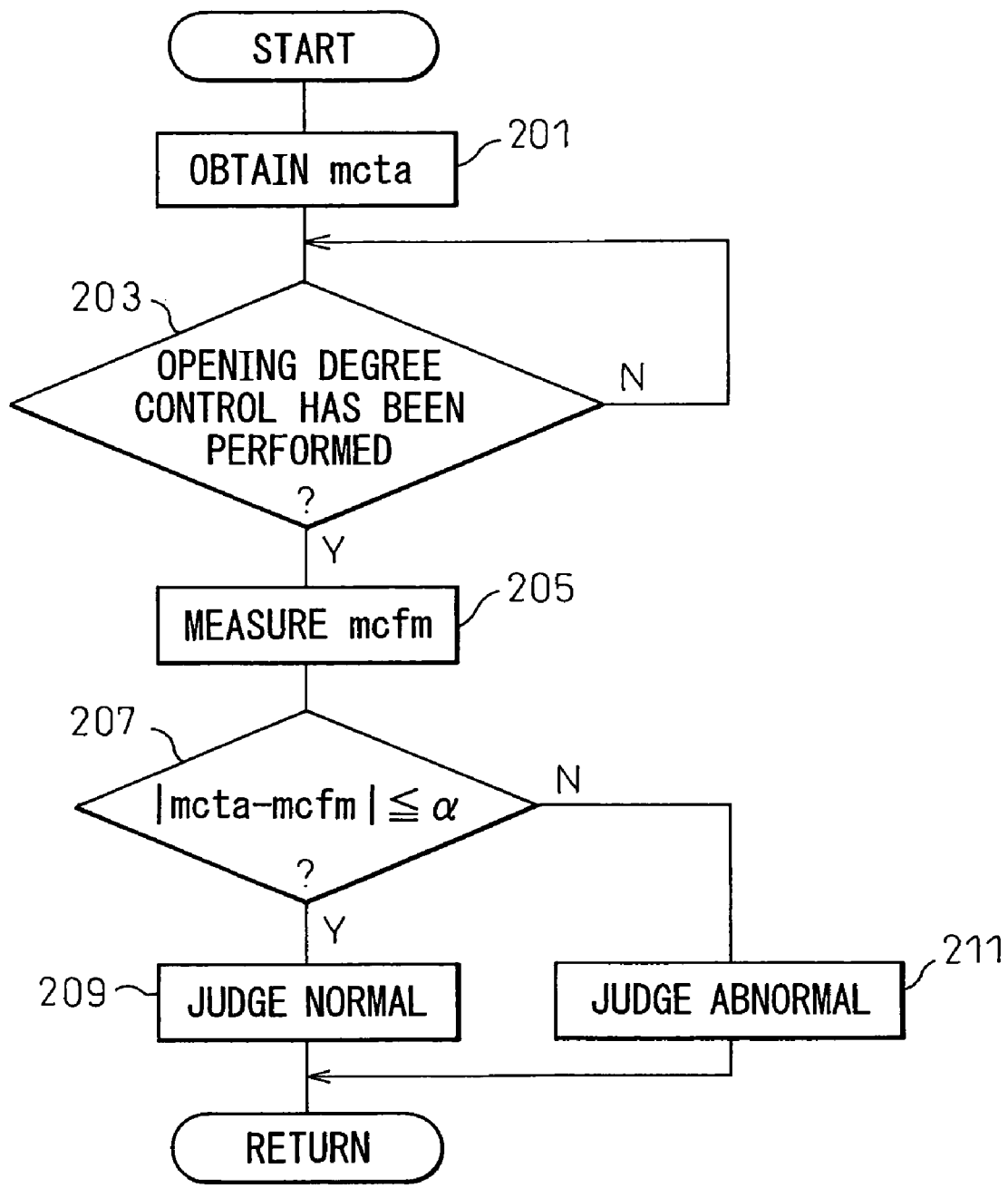
FIG. 14 is a flow chart of a control routine of control for detection of control abnormalities in an embodiment of the present invention.

The control routine of FIG. 14 starts at the time when the target intake air amount mcta is found at step 101 of the control of the intake air amount explained with reference to FIG. 10. At the initial step, step 201, the target intake air amount mcta is obtained. When the target intake air amount mcta is obtained at step 201, at the next step 203, it is judged if the control of the opening degree θt of the throttle valve 12 has been performed.

This judgment determines if the control at step 109 of the control of the intake air amount explained with reference to FIG. 10 has been performed. For example, it is judged if a signal for control of the opening degree has been emitted or if a predetermined time has elapsed from when that signal was emitted.

When it is judged at step 203 that the control of the opening degree θt of the throttle valve 12 has been performed, the routine proceeds to step 205, while if it is judged that the control of the opening degree θt of the throttle valve 12 has not yet been performed, the control of step 203 is performed again. That is, here, the routine proceeds to step 205 if control of the opening degree of the throttle valve 12 has been performed.

At the next step 205, the air flow meter 24 measures the intake air amount (that is, the measured intake air amount) mcfm. Further, when the measured intake air amount mcfm is found at step 205, the routine proceeds to step 207, the target intake air amount mcta and measured intake air amount mcfm are compared. Specifically, in the present embodiment, at step 207, it is judged if the magnitude of the difference between the target intake air amount mcta and the measured intake air amount mcfm (|mcta−mcfm|) is a predetermined allowable difference α or less (that is, here, it may be said that the target intake air amount mcta and the measured intake air amount mcfm are compared and the degree of match is judged).

Further, when it is judged at step 207 that the magnitude of the intake air amount difference (|mcta−mcfm|) is the predetermined allowable difference α or less, the routine proceeds to step 209, where it is judged that the control is normal and the current control is ended. On the other hand, when it is judged that the magnitude of the intake air amount difference (|mcta−mcfm|) is larger than the allowable difference α, the routine proceeds to step 211, where it is judged that the control is abnormal and the current control is ended.

In this way, in the present embodiment, target intake air amount mcta and intake air amount mcfm measured by the air flow meter 24 are compared to detect any control abnormality. Further, by doing this, it becomes possible to simply and more reliably detect any control abnormality in the process of determination of the target throttle opening degree θtta or control of the throttle valve.

Next, another embodiment of the present invention will be explained. This embodiment can be realized by the configuration shown in FIG. 1 and has many parts in common with the above embodiment. Explanations of the parts in common will in principle be omitted.

Figure 15:
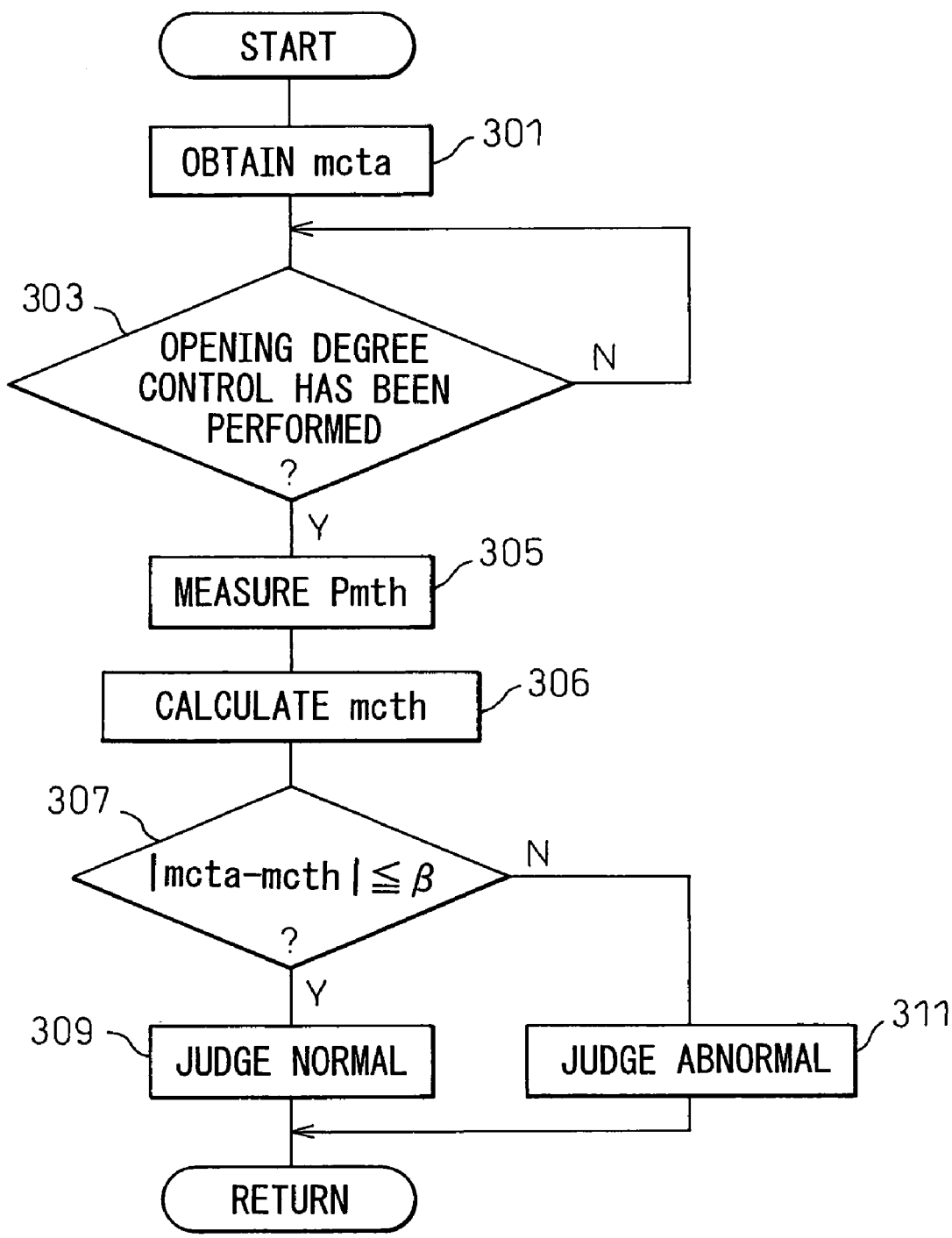
FIG. 15 is a flow chart of a control routine of control for detection of control abnormalities in another embodiment of the present invention.

In this embodiment, any control abnormality is detected by performing the control shown by the control routine of FIG. 15 in parallel with the control of the intake air amount explained with reference to FIG. 10. The control routine of FIG. 15, like the control routine of FIG. 14, starts at the time when the target intake air amount mcta is found at step 101 of the control of the intake air amount explained with reference to FIG. 10. The control at the initial step of the control routine, that is, step 301, and the following step 303 is similar to the control at step 201 and step 203 of the control routine of FIG. 14, so the explanation will be omitted here.

When control proceeds to step 305, the intake pipe internal pressure sensor 25 measures the intake pipe internal pressure (that is, the measured intake pipe internal pressure) Pmth at the downstream side of the throttle valve. Further, at step 305, when the measured intake pipe internal pressure Pmth is found, the routine proceeds to step 306, where the measured intake pipe internal pressure Pmth is used to calculate the intake air amount (that is, the calculated intake air amount) mcth based on the model equation of the above intake valve model.

In this case, the opening characteristic Cv of the intake valve 2 may be set to the target opening characteristic Cvta, so the above Af and Bf (used in the above equation (17)) are made the compliance parameters A and B. That is, here, the calculated intake air amount mcth is calculated by the following equation (23).

$$mcth = Af \cdot Pmth - Bf \quad (23)$$

Further, if the calculated intake air amount mcth is found at step 306, the routine proceeds to step 307, where the target intake air amount mcta and calculated intake air amount mcth are compared. More specifically, in the present embodiment, at step 307, it is judged if the magnitude of the difference between the target intake air amount mcta and the calculated intake air amount mcth (|mcta−mcth|) is a predetermined allowable difference β or less (that is, here, it may be said that the target intake air amount mcta and the calculated intake air amount mcth are compared and the degree of match is judged).

Further, when it is judged at step 307 that the magnitude of the difference between the target intake air amount mcta and the calculated intake air amount mcth (|mcta−mcth|) is the predetermined allowable difference β or less, the routine proceeds to step 309, where the control is judged normal and the current control is ended. On the other hand, when it is judged that the magnitude of the intake air amount difference (|mcta−mcth|) is larger than the allowable difference β, the routine proceeds to step 311, where it judged that the control is abnormal and the current control is ended.

In the above way, in the present embodiment, the target intake air amount mcta and the intake air amount mcth calculated using the intake pipe internal pressure Pmth measured by the intake pipe internal pressure sensor 25 are compared to detect control abnormalities. By doing this as well, it becomes possible to simply and more reliably detect control abnormalities in the process of determination of the target throttle opening degree θtta or control of the throttle valve.

Note that above, the explanation was given taking as an example the case where the valve lift changer 14 and operating timing shifter 15 change only the opening characteristics of the intake valve 2 and do not change the opening characteristics of the exhaust valve 4, but the present invention is not limited to this. Even if applying it to the case where a valve lift changer and operating timing shifter are provided for changing the opening characteristics of the exhaust valve 4, control abnormalities can be detected in the same way as the case of the above embodiments.

Further, the explanation was given taking as an example the case of controlling the intake air amount by cooperative control of a throttle valve 12 and a variable valve operation mechanism including a valve lift changer 14 and opening timing shifter 15, but the present invention is not limited to this. That is, the present invention can also be applied to the case of control of the intake air amount by cooperative operation of the throttle valve and an intake changing means other than the variable valve operation mechanism, for example, a cylinder number changing mechanism, displacement changing mechanism, etc. In this case as well, it is possible to detect control abnormalities in the same way as the case of the above embodiments.

Further, as clear from the explanation up to here, by applying the present invention when control is performed for determining the target throttle opening degree based on the target intake air amount and the above electronic control type transmission is mounted or a system is mounted for preventing sideways sliding etc. and stabilizing the vehicle by controlling the engine output, in the same way as the above embodiments, it is possible to simply and more reliably detect control abnormalities in the process of determination of the target throttle opening degree θtta or control of the throttle valve.

While the invention has been described with reference to specific embodiments chosen for purpose of illustration, it should be apparent that numerous modifications could be made thereto by those skilled in the art without departing from the basic concept and scope of the invention.

The invention claimed is:

1. A control device of an internal combustion engine, wherein the control device
   determines a target throttle opening degree based on a target intake air amount, which is provided with an intake calculation formula for finding an intake air amount based on an intake pipe internal pressure at a downstream side of a throttle valve,
   determines that a control abnormality occurs when a magnitude of a difference between said target intake air amount and an intake air amount found from said intake calculation formula using said intake pipe internal pressure measured by an intake pipe internal pressure sensor is greater than a predetermined value, and determines that no control abnormality occurs when the magnitude of the difference is less than or equal to the predetermined value; and wherein at least one of said target intake air amount and said target throttle opening degree is determined based on a demand of a driver and an operating state of the internal combustion engine, the operating state of the internal combustion engine including opening characteristics of an intake valve or an exhaust valve.

2. A control device of an internal combustion engine as set forth in claim 1, wherein at least one of said target intake air amount and said target throttle opening degree is further determined based on an operating state of a vehicle.

3. The control device of an internal combustion engine as set forth in claim 1, wherein the control device applies the determination whether the control abnormality occurs in controlling the intake air amount by cooperative operation of the throttle valve and one of a variable valve operation mechanism or an intake changer.

* * * * *